United States Patent [19]

Lark

[11] Patent Number: 5,698,132
[45] Date of Patent: Dec. 16, 1997

[54] PROCESS FOR STABILIZING INORGANIC SALTS

[75] Inventor: John C. Lark, Marietta, Ga.

[73] Assignee: Chemgard, Inc., Greenville, S.C.

[21] Appl. No.: 566,308

[22] Filed: Dec. 1, 1995

[51] Int. Cl.$^6$ .................................. C02F 1/42; C02F 5/10
[52] U.S. Cl. .......................... 252/180; 510/247; 510/253; 210/698; 210/701
[58] Field of Search .......................... 252/180; 510/247, 510/253; 525/327.8, 329.7, 329.9, 330.2, 379, 380; 210/698, 701

[56] References Cited

U.S. PATENT DOCUMENTS

| | | |
|---|---|---|
| 4,370,171 | 1/1983 | Robinson et al. .................. 106/448 |
| 4,728,679 | 3/1988 | Lark . |
| 4,814,389 | 3/1989 | Garvey et al. ..................... 525/329.9 |
| 4,818,795 | 4/1989 | Denzinger et al. ................ 525/327.8 |
| 4,913,823 | 4/1990 | Lipinski et al. ................... 210/699 |
| 4,997,862 | 3/1991 | Lark . |
| 5,069,798 | 12/1991 | Hwa et al. ........................ 210/700 |

OTHER PUBLICATIONS

Brochure; Rohm and Haas Company; Acumer Water Treatment Polymers Case History; Oct. 1992; USA.
Bochure; Rohm and Haas Company; Acumer Water Treatment Polymers Acumer TST$^{SM}$ May 1993; USA.
Brochure; Rohm and Haas Company; Acumer Water Treatment Polymers Case History; May 1992; USA.
Bochure; Rohm and Haas Company; Acumer Water Treatment Polymers Acumer$^{TM}$ 5000 for Silica and Magnesium Silicate Scale Control; Apr. 1992; USA.

*Primary Examiner*—Alan Diamond
*Attorney, Agent, or Firm*—Dority & Manning, P.A.

[57] ABSTRACT

The present invention relates to a composition and process for stabilizing inorganic salts. The composition generally includes a carboxylated polymer that has been neutralized with an alphahydroxy amine. The composition can be used, for example, to disperse and suspend inorganic salts, such as silicates and sulfates, in fluids for inhibiting the insoluble inorganic matter from agglomerating and forming deposits on surfaces in contact with the fluid. The present invention is particularly suitable for use in industrial water handling systems such as boilers, coolers, and the like in other various industrial applications where inorganic salts form scale in a vessel in which an aqueous liquid is handled.

15 Claims, No Drawings

PROCESS FOR STABILIZING INORGANIC SALTS

BACKGROUND OF THE INVENTION

The present invention is generally directed to a composition that stabilizes inorganic salts such as silicates and sulfates and, more particularly, to a composition and process for dispersing and suspending insoluble inorganic salts in fluids.

Scaling refers to a process by which insoluble particles contained within a fluid settle, accumulate and deposit on the surfaces of tanks, vessels, pipes and other equipment designed to contain the fluid. For instance, scaling can be a particularly troublesome problem in boilers and cooling towers. The water circulated in these systems can contain various insoluble inorganic salts, such as silicates, which can deposit on the boiler and cooling tube walls. Once deposited on a surface, the inorganic matter acts as an insulator, lowering the heat transfer coefficient and adversely affecting the ability of the boiler or cooling tower to transfer heat. The deposits can also interfere with the flow patterns of the fluids being circulated through the system.

Besides cooling towers and boiler applications, similar scaling problems can also occur in textile baths, such as bleach baths, in pulp and paper processes, in petroleum refinery processes and in other various processes. In these systems, besides silicate deposits, problems have also been experienced with other insoluble inorganic salts, such as sulfates.

Currently, in order to prevent against scaling, the water or other fluid containing the insoluble particulate matter is only allowed to remain in the system a certain number of cycles before being drained and replaced, for normally each cycle produces a greater build up of the unwanted insoluble particles. Clearly, a need exists for a chemical agent that can be added to fluids for preventing scaling.

One commercial prior art product, Acumer 5000 (Rohm and Haas), is available and is touted for suspending colloidal silica in water. However, when tried, it was found that the product only worked at a low pH where the silica products are soluble, and that the product did not perform at a pH around 7. The Acumer 5000 product is believed to be an acrylic.

In view of the problems associated with scaling, the present invention is directed to a composition that disperses and suspends insoluble inorganic matter within fluids to prevent the inorganic matter from settling and forming deposits on surfaces in contact with the fluid. The composition is particularly adapted to disperse and suspend insoluble silicates and sulfates contained within fluids.

SUMMARY OF THE INVENTION

The present invention recognizes and addresses the forgoing disadvantages, and others of prior art constructions and methods.

Accordingly, it is an object of the present invention to provide a composition for suspending insoluble inorganic salts in fluids.

It is another object of the present invention to provide a composition that disperses and suspends insoluble silicates and sulfates in fluids.

Still another object of the present invention is to provide a process for suspending inorganic salts in fluids and for inhibiting the insoluble salts from forming deposits on surfaces in contact with the fluids.

Another object of the present invention is to provide a composition containing a carboxylated polymer that has been neutralized with an alphahydroxy amine that will complex with the anionic portion of insoluble inorganic salts.

These and other objects of the present invention are achieved by providing a composition for complexing with inorganic salts. The composition includes a carboxylated polymer that has been neutralized with an alphahydroxy amine. The carboxylated polymer, for instance, can be polyacrylic acid, polymethacrylic acid, polymaleic acid, copolymers thereof, and mixtures thereof. The alphahydroxy amine, on the other hand, can be an alcohol amine, such as an ethanol amine, a propanol amine, or the like.

The alphahydroxy amine neutralized carboxylated polymer can be provided in an aqueous solution. For example, the composition can be present in an aqueous solution in an amount of up to about 80 percent by weight of neutralized polymer. Once the alphahydroxy amine has been combined with the carboxylated polymer, the resulting product should preferably have a pH of at least 5.0 or higher.

The composition is particularly well adapted for suspending silicates and sulfates in liquids. In one preferred embodiment, the composition is a 50% aqueous solution of polyacrylic acid that has been neutralized with monoisopropanol amine to a pH of 7.0.

The objects and objectives of the present invention are also achieved by providing a process for suspending insoluble inorganic salts in a fluid. The process includes the step of adding to a fluid containing components which may form insoluble inorganic salts a product of a carboxylated polymer that has been neutralized With an alphahydroxy amine. The product can be contained within an aqueous solution prior to adding to the fluid. The carboxylated polymer and alphahydroxy amine composition is present in the fluid in a concentration of at least 5 ppm, preferably, from about 10 ppm to about 100 ppm. Through this process, the insoluble inorganic salts are dispersed and suspended within the fluid and formation of deposits on surfaces in contact with the fluid is inhibited.

Other objects, features and aspects of the present invention are discussed in greater detail below.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention which broader aspects are embodied in the exemplary construction.

As described above, the present invention is generally directed to a composition and process for suspending insoluble inorganic salts in a fluid. When added to fluids, the composition inhibits the insoluble salts from settling and forming deposits on surfaces in contact with the fluid. It is believed that the composition will also slowly breakdown and disperse deposits that have previously formed on a surface. Thus far, it has been found that the composition will suspend and stabilize silicates and sulfates.

The composition of the present invention generally comprises a carboxylated polymer that has been neutralized with an alphahydroxy amine. More particularly, the composition includes the product of a carboxylated polymer that has been neutralized with an alphahydroxy amine in a manner such that the resulting product has a pH of at least 5.0.

As used herein, a carboxylated polymer refers to a polymer or copolymer that contains a repeating carboxylic acid group (COOH) as substantially the only functional group on the polymer chain. Some examples of carboxylated polymers that may be used in the present invention include polyacrylic acids, polymethacrylic acids, copolymers of polyacrylic and polymethacrylic acids, polymaleic acids, and polyacrylic maleic copolymers. Preferably, the carboxylated polymer used in the present invention has a molecular weight of at least 2,000.

Carboxylated polymers as described above can be obtained from a number of commercial sources. Prior to combining with the alphahydroxy amine, the carboxylated polymer can exist in an aqueous solution. The carboxylated polymer preferably has an acidic pH, for instance, a pH between about 1 and about 3. The lower the pH of the polymer prior to being contacted with the alphahydroxy amine, the more product is formed for complexing with inorganic salts. If necessary, an acid, such as hydrochloric acid or formic acid, can be added to the carboxylated polymer to lower the pH prior to being blended with the alphahydroxy amine to ensure acidic carboxylic groups.

An alphahydroxy amine, according to the present invention, refers to any amine having the following general formula:

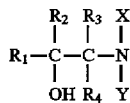

wherein, $R_1$, $R_2$, $R_3$, $R_4$, X and Y are nonfunctional groups that do not interfere or inhibit the neutralization of the carboxylated polymer. More particularly, $R_1$, $R_2$, $R_3$, $R_4$, X and Y can be hydrogen, a hydrocarbon group, for instance, having the formula ($C_nH_{2n+1}$ wherein n=0,1,2 ... ), or any other chemical group that, again, does not interfere or inhibit the process and objectives of the present invention. As shown, the amine can be a primary, a secondary, or a tertiary amine.

Typically, $R_2$, $R_3$, and $R_4$ will appear as hydrogen resulting in the following formula:

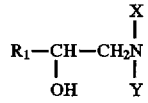

wherein $R_1$, X and Y are as stated above.

As merely exemplary and without limitation, the alphahydroxy amine can be an ethanol amine, such as monoethanol amine, diethanol amine, triethanol amine, or N-methyl ethanol amine. Propanol amines are also well suited for use in the present invention. Examples of propanol amines include monoisopropanol amine, 2-amino-1-propanol or α-amino-n-propanol.

Thus far, it has been found that amines having smaller molecular structures are preferred. Consequently, when appearing as hydrocarbons, $R_1$, $R_2$, $R_3$, $R_4$, X and Y above should preferably have a carbon chain of 10 carbon atoms or less.

In forming the composition of the present invention, the alphahydroxy amine as described above is combined with a carboxylated polymer. In essence, the polymer is neutralized by the amine. The amine should be added to the carboxylated polymer in an amount sufficient to raise the pH of the mixture to at least 5.0 and more particularly to at least 6.0. Although an upper pH limit is not critical, in one embodiment the pH of the final solution can be between about 6.0 and 8.0. To achieve a pH of 7.0, the alphahydroxy amine and the carboxylated polymer can be added in an equimolar ratio based on the ratio of amine groups to carboxylic acid groups.

During neutralization, the carboxylated polymer acts as a proton donor while the alphahydroxy amine acts as a proton acceptor. It is believed that the alphahydroxy amine ionically bonds with the carboxylated polymer. Preferably, protonation is maximized between the polymer and the amine. Consequently, in a preferred embodiment, the polymer initially has a very low pH as discussed above and the amine is added to the polymer until the pH is approximately 7.0.

For instance, in one preferred embodiment, a 50 percent monoisopropanol amine solution was added to a 50 percent aqueous solution of polyacrylic acid. The monoisopropanol amine was added until the pH of the mixture was 7.0. The resulting composition had a solids content of 50 percent.

As stated above, the composition of the present invention is well adapted for stabilizing and/or suspending insoluble inorganic salts in fluids. Thus far, the composition of the present invention has been found to work well with silicates and sulfates. In stabilizing the inorganic salts, it is believed that the carboxylated polymer and alphahydroxy amine product complex with the insoluble particles, altering the ability of the insoluble particles to agglomerate into large particles which readily separate from the fluid medium. The amine neutralized carboxylated polymer acts as a dispersant to inhibit the insoluble particles from agglomerating and forming deposits.

It is believed that the carboxylated polymer and amine product act upon the anionic portion of the inorganic salt, rather than coordinating with the metal or cationic portion of the salt. It is also believed that the product of the present invention complexes directly with silicate and sulfate groups. Thus, it is believed that the present invention will work well with silicates and sulfates, regardless of the metal or cation associated therewith.

Examples of insoluble silicates that can be stabilized by the composition of the present invention include alkaline silicates. Such silicates include barium silicates, such as barium metasilicate, magnesium silicates, and calcium silicates. The composition can also disperse and stabilize complex naturally occurring silicates when found in an insoluble form.

Similar to silicates, it is believed that the composition of the present invention will also be effective in stabilizing and suspending insoluble sulfates. In particular, these sulfates include the alkaline sulfates, such as barium sulfate.

When added to a fluid, the composition of the present invention should be added at a concentration sufficient to stabilize or disperse the targeted insoluble inorganic salts. In most applications, when the composition of the present invention is contained in a fifty percent aqueous solution, the composition should be added to the fluid at a concentration of at least 5 ppm. Thus far, good results have been obtained when the concentration is between about 5 ppm to about 100 ppm and more particularly between about 10 ppm and about 50 ppm. Of course, the actual concentration for a particular application will depend upon the potential amount of inorganic salts contained within the fluid, operation of the systems in which the fluid is handled, and the like. Also, addition of the composition of the present invention may be added directly to the vessel, to the make-up in water or in any other manner to introduce the neutralized polymer to the process fluid.

Also, in many industrial environs there may be a buildup of neutralized polymer in the liquid over a period of time. For example, in apparatus of the general types stated in examples below, i.e. where evaporation coolers are involved, evaporation of water can cause a concentration of both solids and polymer. Typically, make-up water is added to bring the water back to an expected level, and if further neutralized polymer is also added, a higher level of neutralized polymer than being added with the make-up water can be present. In some situations water is bled off from the equipment and make-up water and neutralized polymer added. Here the concentration may or may not build up depending on the neutralized polymer content in the water being bled off. Concentration of neutralized polymer in the process fluid such as water can therefore vary. Hence by adding an amount of neutralized polymer based on fluid addition to achieve a minimum level of polymer concentrations in the vessel should achieve the intended result. At the same time if adequate neutralized polymer has accumulated in the process vessel to give the desired result, lesser amounts may be included with additions of fluid such as make-up water.

The composition of the present invention is particularly well suited for use in boilers, cooling towers and other systems that heat water and/or use water as a cooling fluid. Besides occurring naturally, silicates, sulfates and other insoluble inorganic salts can also be created during a particular process. For instance, in textile bleach baths, silicates are added to stabilize any peroxides contained in the bath. Unfortunately, some of the silicates that are added form insoluble magnesium silicate and deposit on the walls of the vessels. The composition of the present invention can be added to such baths in order to inhibit the deposits from forming.

The present invention may be better understood by reference to the following examples.

EXAMPLE 1

The following test was preformed in order to evaluate the dispersing potential of a composition made in accordance with the present invention.

Fifty (50) milliliters of a 0.1 molar solution of barium chloride was placed in a beaker. The barium chloride was then titrated with a 0.1 molar solution of sodium silicate causing formation of barium metasilicate. The sodium silicate solution was added until the turbidity of the resulting solution was at a high point and the barium metasilicate began to settle. The volume of the sodium silicate added was recorded as the control.

The procedure was then repeated except that a composition containing the neutralized product of a carboxylated polymer and an alphahydroxy amine was added to the barium chloride solution prior to titration with the sodium silicate. Specifically, the polymer and amine composition was made from polyacrylic acid that had been neutralized to a pH of 7 with monoisopropanol amine. The neutralized product was in a fifty (50) percent aqueous solution which was added to the barium chloride solution at a concentration of 10 ppm.

The above procedure was then again repeated except the concentration of the carboxylated polymer and amine composition in the barium chloride solution was increased to 20 ppm. The following results were obtained:

TABLE 1

| Concentration of Carboxylated Polymer and Amine Composition | Amount of Sodium Silicate Added Until the Precipitate Began to Settle |
| --- | --- |
| control | 1.25 ml |
| 10 ppm | 4.38 ml |
| 20 ppm | 6.88 ml |

As shown, when the composition of the present invention was added to the barium chloride solution, much more barium metasilicate formed before settling occurred. The carboxylated polymer and amine composition dispersed and suspended the barium metasilicate in the aqueous solution.

The control and the two solutions containing the carboxylated polymer and amine composition were then stored overnight to observe the stability of the resulting suspensions. On the following day, a small layer of precipitate, having a thickness of less than 2 mm, had settled in the bottom of the vials. The control provided a hard settled layer which was agglomerated and did not disperse. In the vials containing the composition of the present invention, on the other hand, the settled precipitate readily redispersed in the water medium when gently stirred.

EXAMPLE 2

The tests described in Example 1 were repeated except that instead of titrating barium chloride with sodium silicate, sodium sulfate was titrated with barium chloride. Specifically, 50 ml of a 0.1 molar sodium sulfate solution was titrated with a 0.1 molar barium chloride solution causing barium sulfate to form. The following results were obtained:

TABLE 2

| Concentration of Carboxylated Polymer and Amine Composition | Amount of Barium Chloride Added Until the Precipitate Began to Settle |
| --- | --- |
| control | 0.25 ml |
| 10 ppm | 0.7 ml |
| 20 ppm | >4.0 ml |

Again, the control and both dispersions containing the carboxylated polymer and amine composition were stored without stirring overnight. The following day, a 2 to 3 mm layer of precipitate was observed in the bottom of both vials. The settled precipitate of the control did not redisperse while the precipitate included in the vials containing the composition of the present invention readily redispersed in the water medium when gently stirred.

EXAMPLE 3

The tests conducted in Example 1 were again repeated using a starting solution of 0.1 molar ammonium sulfate that was titrated with a 0.1 molar barium chloride solution to form barium sulfate. In this example, besides a control, only one test was performed using the carboxylated polymer and amine composition. The composition was added to the ammonium sulfate solution at a concentration of 20 ppm. Also, a magnetic stirring bar continuously mixed the solutions during each test. Barium chloride was slowly added to the ammonium sulfate until the resulting solution was so turbid that the stirring bar could not be seen. The following results were obtained:

TABLE 3

| Concentration of Carboxylated Polymer and Amine Composition | Amount of Barium Chloride Added Until the Stirring Bar Could Not Be Seen |
|---|---|
| control | <1.0 ml |
| 20 ppm | 4.2 ml |

As shown, the composition of the present invention is particularly well adapted for dispersing barium sulfate in aqueous solutions.

In both of the above tests, the solutions were allowed to stand in a static condition until the precipitate had settled to the bottom of the vials. In the case of the control, the precipitate formed a very hard layer on the bottom of the vial. In the vial containing the composition of the present invention, however, the settled precipitate readily redispersed upon gentle agitation.

EXAMPLE 4

The following tests were preformed in order to evaluate the effectiveness of different carboxylated polymers in dispersing and suspending a barium metasilicate precipitate in an aqueous solution.

A carboxylated polymer and alphahydroxy amine composition at a concentration of 20 ppm was added to 50 ml of a 0.1 molar solution of barium chloride. A 0.1 molar solution of sodium silicate was slowly added causing barium metasilicate to form. The sodium silicate was added until the precipitation of the barium metasilicate began.

This procedure was repeated four times using four different carboxylated polymers combined with monoisopropanol amine at a pH of 7 and in a 50% aqueous solution. The four different carboxylated polymers tested were polymethacrylic acid, polyacrylic/methacrylic copolymer, polyacrylic acid, and an anionic terpolymer made from acrylic acid, maleic acid and an unknown third monomer. The following results were obtained:

TABLE 4

| Carboxylated Polymer | Amount of Sodium Silicate Added Until the Precipitate Began to Settle |
|---|---|
| Polymethacrylic Acid | 7.3 ml |
| Polyacrylic/methacrylic acid | 6.9 ml |
| Polyacrylic acid | 7.3 ml |
| Anionic terpolymer | <1.0 ml |

As shown above, all of the polymers were very effective in maintaining the barium metasilicate precipitate in suspension in the aqueous medium except for the anionic terpolymer which is believed to contain functional groups other than carboxyl groups.

The present invention was tested in several industrial environs to confirm efficiency of same.

EXAMPLE 5

A fifty percent aqueous solution of polyacrylic acid neutralized with monoisopropanol amine to a pH of 7 was added to the make-up water for a conventional ammonia compressor-evaporation condenser arrangement. Make-up water analysis revealed 450 ppm total dissolved solids, 220 ppm total hardness and 90 ppm, silica ($SiO_2$). The above solution was added to a level of 20 ppm, and over a period of time, allowed operation above normal silica levels. While under normal operation silica levels of about 180 ppm were historically reached before onset of precipitation, addition of the composition of the present invention over time resulted in water levels containing about 250 ppm silica without precipitation. Also there was no indication of scale and no high head pressures were observed in the ammonia compressors following the test. It is also believed that higher silica values could have been obtained but the trial was discontinued. The present invention thus permitted a greater number of cycles than experienced in normal operations, without any observable scale build up.

EXAMPLE 6

The composition of Example 5 was added to an ammonia compressor-evaporation condenser system in a bakery. Make-up water analysis showed pH of 7.7; conductivity of 400 mmhos, total hardness of 48 ppm, total alkalinity of 170, p alkalinity of 0 and silica ($SiO_2$) at 27 ppm. Before start of the test, water conductivity in the system measured approximately 5000 mmhos and scale had formed on the side walls of the condenser tower and on the outside of the ammonia gas lines. The composition according to the present invention was added to the make-up water along with a further conventional polymer addition for the system. While the identity of the other polymers was not known, they had been in use in the system prior to the test, and when the scale formed. The composition according to the present invention was present in the make-up water at a level of approximately 20 ppm, with make-up water being added according to normal procedures. Within two weeks of addition of the composition according to the present invention, conductivity was reduced to about 1000 mmhos, and scale began to fall off the sides and tubes within the condenser tower, and continued to fall off for the six month duration of the trail. This test thus shows that the present invention is useful for removal of existing scale.

EXAMPLE 7

A 1200 ton centrifugal refrigeration machine that had always experienced problems with deposits in the condenser tubes was also tested. Make-up water analysis showed pH of 7.2, total alkalinity of 35 ppm, total hardness of 58 ppm, conductivity of 90–110 mmhos and 60–70 ppm silica ($SiO_2$). After treatment with the composition of Example 5 added to make-up water (along with other conventional water treatment chemicals) at a level of 20 ppm for about six months, the condenser was opened and the tubes were found to be practically clean. Only a slight, soft film was present which was easily removed with brushing.

The above examples thus show that the present invention works in an industrial setting as well as in the laboratory.

These and other modifications and variations of the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for reducing the formation of silicate scale in an industrial water handling process comprising the step of adding to water in the process a carboxylated polymer that has been neutralized with an alphahydroxy amine, said carboxylated polymer comprising a polyacrylic maleic copolymer, said neutralized carboxylated polymer complexing with silicates contained in said water for inhibiting said silicates from forming scale.

2. A process as defined in claim 1, wherein said neutralized carboxylated polymer is present in said water at a concentration of at least about 5 ppm.

3. A process as defined in claim 1, wherein said neutralized carboxylated polymer is present in said water at a concentration of from about 5 ppm to about 100 ppm.

4. A process as defined in claim 1, wherein said neutralized carboxylated polymer is present in said water at a concentration of from about 10 ppm to about 50 ppm.

5. A process as defined in claim 1, wherein said alphahydroxy amine is monoisopropanol amine.

6. A process as defined in claim 1, wherein said carboxylated polymer and said alphahydroxy amine are in an aqueous solution having a pH of at least 5.0 when added to said water in said process.

7. A process as defined in claim 6, wherein said aqueous solution has a pH of from about 6.0 to about 8.0.

8. A process as defined in claim 6, wherein said neutralized carboxylated polymer is present in said aqueous solution in an amount from about 40% to about 60% by weight.

9. A process as defined in claim 1, wherein said carboxylated polymer has a molecular weight of at least about 2,000.

10. A process for reducing the formation of silicate scale in an industrial water handling process comprising the step of adding to water in the process a polyacrylic maleic copolymer that has been neutralized with monoisopropanol amine, said neutralized polyacrylic maleic copolymer being present in said water at a concentration of at least about 5 ppm, said neutralized polyacrylic maleic copolymer complexing with silicates contained in said water for inhibiting said silicates from forming scale.

11. A process as defined in claim 10, wherein said neutralized polyacrylic maleic copolymer is present within said water at a concentration of from about 5 ppm to about 100 ppm.

12. A process as defined in claim 10, wherein said neutralized polyacrylic maleic copolymer is present within said water at a concentration of from about 10 ppm to about 50 ppm.

13. A process as defined in claim 10, wherein said neutralized polyacrylic maleic copolymer is in an aqueous solution having a pH of from about 6.0 to about 8.0 when added to said water in said process.

14. A process as defined in claim 13, wherein said neutralized polyacrylic maleic copolymer is present in said aqueous solution in an amount from about 40% to about 60% by weight.

15. A process as defined in claim 10, wherein said polyacrylic maleic copolymer has a molecular weight of at least about 2,000.

* * * * *